(12) United States Patent
Doi

(10) Patent No.: US 11,506,889 B2
(45) Date of Patent: Nov. 22, 2022

(54) VEHICLE INSTRUMENT PANEL STRUCTURE

(71) Applicant: Toyota Jidosha Kabushiki Kaisha, Toyota (JP)

(72) Inventor: Madoka Doi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 431 days.

(21) Appl. No.: 16/718,734

(22) Filed: Dec. 18, 2019

(65) Prior Publication Data

US 2020/0249477 A1 Aug. 6, 2020

(30) Foreign Application Priority Data

Feb. 1, 2019 (JP) ............................. JP2019-017042

(51) Int. Cl.
*B60K 37/02* (2006.01)
*B60S 1/54* (2006.01)
(Continued)

(52) U.S. Cl.
CPC ....... *G02B 27/0101* (2013.01); *B60H 1/3407* (2013.01); *B60K 37/02* (2013.01);
(Continued)

(58) Field of Classification Search
CPC ............ G02B 27/0101; G02B 27/0149; B60H 1/3407; B60H 1/242; B60H 1/34; B60K 37/02; B60K 2370/334; B60K 2370/1529; B60K 2370/658; B60K 35/00; B60K 37/00; B60K 37/04; B60K 37/06; B60S 1/54; B60S 1/023
See application file for complete search history.

(56) References Cited

U.S. PATENT DOCUMENTS 5,305,011 A * 4/1994 Furuya .................. B60K 35/00
340/980
2016/0121852 A1 5/2016 Yoshimura et al.
(Continued)

FOREIGN PATENT DOCUMENTS

JP 2016-016852 A 2/2016
JP 2016-088195 A 5/2016
(Continued)

*Primary Examiner* — Douglas M Wilson
(74) *Attorney, Agent, or Firm* — Dinsmore & Shohl LLP

(57) ABSTRACT

A vehicle instrument panel structure including: a head-up display device that is provided within an instrument panel positioned at a front section of a vehicle cabin and that displays information by projecting light onto a windshield; a defroster that is provided within the instrument panel so as to be disposed alongside the head-up display device in a vehicle width direction, and that conveys air toward the windshield; a guide section that is provided at an upper face of the instrument panel so as to be disposed between the head-up display device and the defroster, and that has a cross-section profile as sectioned along the vehicle width direction profiled so as to cause airflow from the defroster to cling to a surface of the guide section such that the airflow is blown toward an area of the windshield in which information is displayed by the head-up display device.

6 Claims, 4 Drawing Sheets

(51) Int. Cl.
*B60H 1/34* (2006.01)
*B60H 1/24* (2006.01)
*B60K 37/04* (2006.01)
*B60S 1/02* (2006.01)
*G02B 27/01* (2006.01)

(52) U.S. Cl.
CPC ............ *B60S 1/54* (2013.01); *G02B 27/0149* (2013.01); *B60H 1/242* (2013.01); *B60H 1/34* (2013.01); *B60K 37/04* (2013.01); *B60K 2370/1529* (2019.05); *B60K 2370/334* (2019.05); *B60K 2370/658* (2019.05); *B60S 1/023* (2013.01)

(56) References Cited

U.S. PATENT DOCUMENTS

| | | | | |
|---|---|---|---|---|
| 2017/0059864 | A1* | 3/2017 | Takahashi | G02B 27/0101 |
| 2019/0187470 | A1* | 6/2019 | Boettcher | B60H 1/00 |

FOREIGN PATENT DOCUMENTS

| | | |
|---|---|---|
| JP | 2016-088260 A | 5/2016 |
| JP | 2018-004788 A | 1/2018 |

* cited by examiner

VEHICLE INSTRUMENT PANEL STRUCTURE

CROSS-REFERENCE TO RELATED APPLICATION

This application is based on and claims priority under 35 USC 119 from Japanese Patent Application No. 2019-017042 filed on Feb. 1, 2019, the disclosure of which is incorporated by reference herein.

BACKGROUND

Technical Field

The present disclosure relates to a vehicle instrument panel structure.

Related Art

Japanese Patent Application Laid-Open (JP-A) No. 2018-4788 discloses a head-up display device. This head-up display device is provided within an opening open toward a vehicle upper side in an upper face of an instrument panel. The head-up display device projects an image onto a windshield from an image output device.

The head-up display device and a defroster that defogs the windshield by conveying an airflow toward the windshield are sometimes disposed alongside each other in a vehicle width direction inside the instrument panel. In cases in which a head-up display device and a defroster are disposed alongside each other in the vehicle width direction, the vehicle width direction width over which air is conveyed from a defroster nozzle toward the windshield is reduced as a result of the head-up display device. In particular, a tendency is emerging in recent years for larger head-up display devices accompanying the increase in information that is being displayed using the head-up display devices. This might result in even narrower width for conveying air. A narrower width for conveying air might be detrimental to the performance of the defroster in clearing fog, particularly from an area of the windshield in which images are displayed by the head-up display device. The related art described above leaves room for improvement in this respect.

SUMMARY

In consideration of the above circumstances, the present disclosure provides an vehicle instrument panel structure capable of efficiently removing fog from an area of a windshield in which images are displayed by a head-up display device.

A vehicle instrument panel structure according to a first aspect of the present disclosure includes a head-up display device, a defroster, and a guide section. The head-up display device is provided within an instrument panel positioned at a front section of a vehicle cabin and displays information by projecting light onto a windshield. The defroster is provided within the instrument panel so as to be disposed alongside the head-up display device in a vehicle width direction, and conveys air toward the windshield. The guide section is provided at an upper face of the instrument panel so as to be disposed between the head-up display device and the defroster, and has a cross-section profile as sectioned along the vehicle width direction profiled so as to cause airflow from the defroster to cling to a surface of the guide section such that the airflow is blown toward an area of the windshield in which information is displayed by the head-up display device.

In the first aspect of the present disclosure, the head-up display device and the defroster are disposed alongside each other in the vehicle width direction within the instrument panel, and the guide section is provided at the upper face of the instrument panel so as to be disposed between the head-up display device and the defroster. The guide section has a cross-section profile as sectioned along the vehicle width direction profiled so as to cause airflow from the defroster to cling to the surface of the guide section, such that the airflow is blown toward an area of the windshield in which information is displayed by projecting light from the head-up display device (hereafter simply referred to as "projection area"). An airflow traveling from the defroster, past the guide section, and toward the projection area is thereby generated. Since the airflow is conveyed directly toward the projection area, the projection area can be quickly defogged.

Note that "cling" refers to a phenomenon in which the airflow flows while being attracted to the surface of the guide section, according to what is referred to as the Coanda effect.

A vehicle instrument panel structure according to a second aspect of the present disclosure is the first aspect, wherein the guide section has a cross-section profile as sectioned along the vehicle width direction profiled so as to protrude toward a vehicle upper side.

In the second aspect of the present disclosure, the guide section has a cross-section profile as sectioned along the vehicle width direction that protrudes toward the vehicle upper side. Thus, airflow blown from the defroster flows from a lower end portion on the defroster side of the guide section while clinging to the guide section in a range in the vicinity of an apex portion of the guide section in a vehicle front-on view. As the airflow begins to head from the apex portion toward a lower end portion on the head-up display device side of the guide section, the airflow separates from the guide section and flows toward the projection area under inertia. Namely, an airflow flowing from the defroster toward both the head-up display device and substantially the vehicle lower side can be generated, thereby enabling the airflow to be conveyed directly toward the projection area as well.

A vehicle instrument panel structure according to a third aspect of the present disclosure is the first aspect or the second aspect, wherein the guide section is configured by a member having a different external appearance from the instrument panel.

In the third aspect of the present disclosure, since the guide section is configured by a member having a different external appearance from the instrument panel, the guide section may be said to accentuate the external styling. Namely, the guide section may be employed decoratively.

A vehicle instrument panel structure according to a fourth aspect of the present disclosure is any one of the first aspect to the third aspect, wherein the guide section includes at least a portion configured as a contiguous plane to a side wall on the head-up display device side of a defroster nozzle configuring part of the defroster in a vehicle front-on view.

In the fourth aspect of the present disclosure, of an airflow conveyed from the defroster toward the windshield, airflow flowing along the side wall on the head-up display device side of the defroster nozzle configuring part of the defroster flows more smoothly toward the guide section. Since the airflow clings more readily to the guide section, the airflow can be efficiently conveyed toward the projection area.

The vehicle instrument panel structure according to the first aspect of the present disclosure exhibits an effect of enabling fog on the area of the windshield in which images are displayed by the head-up display device to be efficiently removed.

The vehicle instrument panel structures according to the second aspect and the fourth aspect of the present disclosure exhibit an effect of enabling fog on the area of the windshield in which images are displayed by the head-up display device to be still more efficiently removed.

The vehicle instrument panel structure according to the third aspect of the present disclosure exhibits an effect of enabling both efficient removal of fog on the windshield and external styling qualities to be achieved.

BRIEF DESCRIPTION OF THE DRAWINGS

Exemplary embodiments of the present disclosure will be described in detail based on the following figures, wherein.

DETAILED DESCRIPTION

Figure 1:
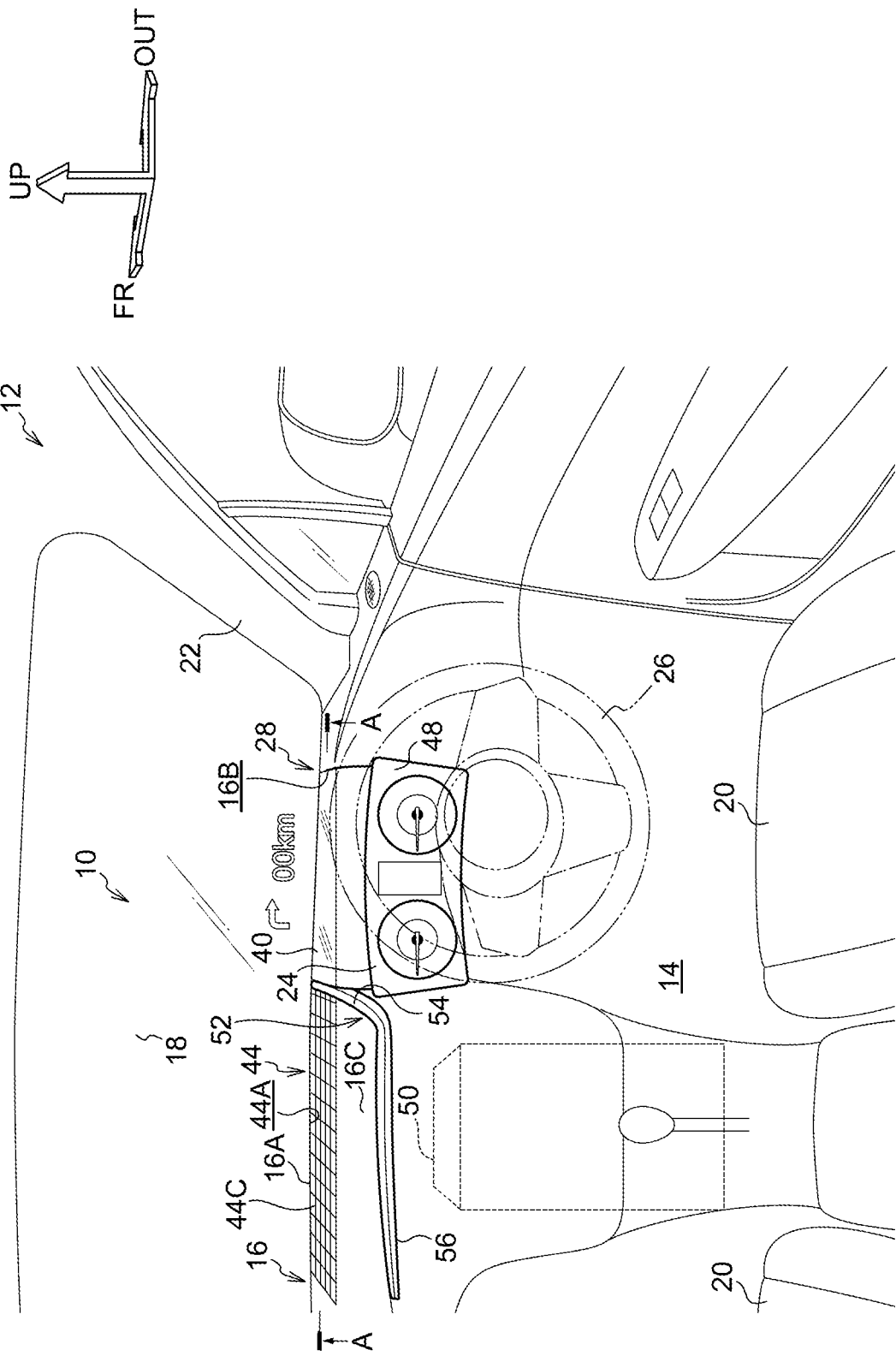
FIG. 1 is a schematic perspective view illustrating an instrument panel including a vehicle instrument panel structure according to an exemplary embodiment, as viewed from a vehicle rear side.

Explanation follows regarding a vehicle instrument panel structure 10 of the present disclosure, with reference to FIG. 1 to FIG. 4. Note that in the drawings, the arrow FR, the arrow UP, and the arrow OUT respectively indicate a forward direction (a direction of travel), an upward direction, and a vehicle width direction outer side of a vehicle as appropriate. In the following explanation, unless specifically stated otherwise, reference simply to front and rear, left and right, and upward and downward directions refers to front and rear in a vehicle front-rear direction, left and right in a vehicle left-right direction (vehicle width direction), and upward and downward in a vehicle vertical direction.

Overall Configuration

An instrument panel 16 is provided in a front section of a vehicle cabin 14 of a vehicle 12. The instrument panel 16 is disposed at an upper side of a vehicle rear side of a dash panel (not illustrated in the drawings) that partitions the vehicle cabin 14 from a vehicle front section. A lower end portion of the dash panel is joined to a front end portion of a non-illustrated floor panel. The floor panel configures a lower surface in the vehicle cabin 14. A non-illustrated cowl is joined to an upper end portion of the dash panel. The cowl supports a lower end portion of a windshield 18. The windshield 18 configures a front surface at an upper side of the vehicle cabin 14, and a lower end portion side of the windshield 18 is disposed at a front end portion 16A side of the instrument panel 16.

Vehicle seats 20, serving as front vehicle seats, are provided at the vehicle rear side of the instrument panel 16. In the present exemplary embodiment, a vehicle seat 20 at the left side of the front section of the vehicle cabin 14 configures a front passenger seat, and a vehicle seat 20 at the right side of the front section of the vehicle cabin 14 configures a driving seat.

Instrument Panel

The instrument panel 16 is configured as a resin interior panel member extending along the vehicle width direction. Elongated instrument panel reinforcement (not illustrated in the drawings) is installed so as to run along the vehicle width direction at a (vehicle front side) upper portion within the instrument panel 16, and the instrument panel 16 is attached to the instrument panel reinforcement at plural locations. Note that the instrument panel reinforcement is a metal pipe member, and the two length direction end portions of the instrument panel reinforcement are fixed to vehicle lower sides of a pair of front pillars 22 (left and right framework members; the front pillar 22 on the left side is not illustrated) projecting upright at left and right vehicle body side sections.

A meter section 24 is provided on the driving seat side of the instrument panel 16. The meter section 24 is provided at an upper portion of the instrument panel 16 at a position corresponding to a steering wheel 26, and is configured including a display panel 48 formed in a substantially rectangular shape with its length direction substantially in the vehicle width direction so as to face into the vehicle cabin 14. As an example, the display panel 48 is configured by a liquid crystal panel, and is capable of displaying the speed of the vehicle 12 and an operation status and the like of a power unit.

Head-Up Display Device

A head-up display device 28 is provided within the instrument panel 16 on the driving seat side. Specifically, the head-up display device 28 is provided within an opening 16B that is formed in an upper face 16C on the driving seat side of the instrument panel 16 at the front end portion 16A, and that is open toward the vehicle upper side. A display unit that outputs an emission image as output light for information display and that is connected to a display control device so as to be capable of communicating therewith, and a reflector that reflects the emission image from the display unit (neither of these components are illustrated in the drawings), are provided inside the head-up display device 28. The display unit is disposed at a vehicle front-rear direction rear portion inside the head-up display device 28, and emits the emission image toward the vehicle front side. The display unit includes a light source configured by a light-emitting diode or the like.

The reflector is disposed at a vehicle front-rear direction front portion inside the head-up display device 28, so as to oppose the display unit. As an example, the reflector is configured by a concave mirror disposed so as to curve away from the display unit. The reflector is disposed inclined such that an upper portion is toward the vehicle front side and a lower portion is toward the vehicle rear side in a side view of the vehicle. The emission image from the display unit is thus reflected obliquely toward the vehicle upper rear side, and also enlarged, by the reflector.

The emission image reflected by the reflector is projected onto the windshield 18 through a transparent cover member 40 attached to the opening 16B formed in the upper face 16C of the instrument panel 16. The emission image from the display unit is thus guided by the reflector, and the emission image that has been reflected and enlarged by the reflector is projected within a projection area S, demarcated by the double-dotted dashed lines in FIG. 3, for information display on the windshield 18. As an example, the head-up display device 28 displays the travel speed of the vehicle 12, guidance to a destination, a road speed limit, and the like within the projection area S of the windshield 18.

Defroster

Figure 3:
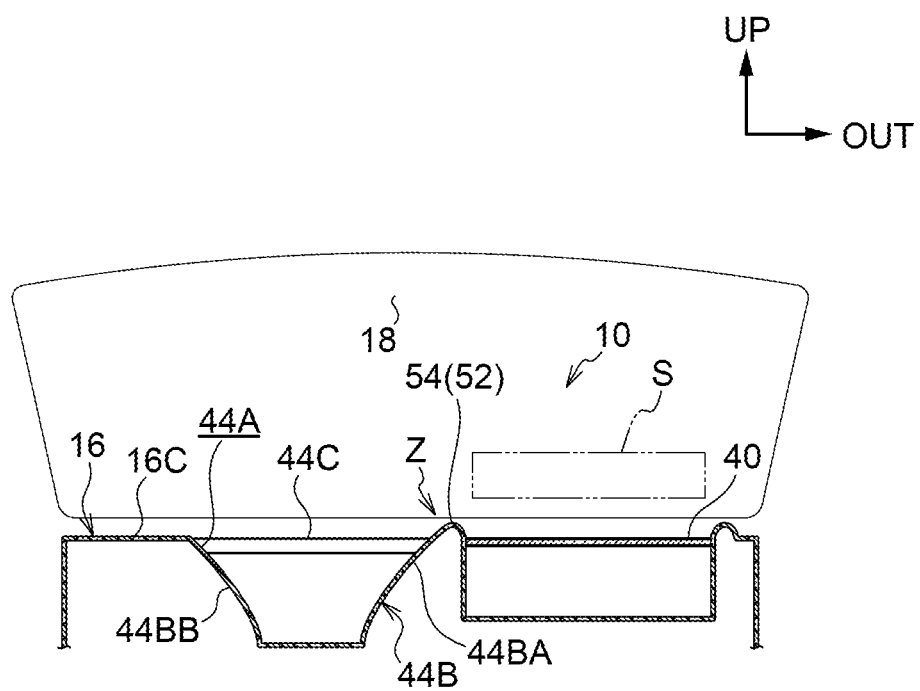
FIG. 3 is a cross-section sectioned along line A-A in FIG. 1.

A defroster 44 is provided at a substantially vehicle width direction central portion inside the instrument panel 16. The defroster 44 includes a defroster opening 44A and a defroster nozzle 44B (see FIG. 3). As illustrated in FIG. 3, the defroster opening 44A is configured by an opening formed in the front end portion 16A of the upper face 16C at the substantially vehicle width direction central portion of the instrument panel 16 so as to be open toward the vehicle upper side, and is covered from the vehicle upper side by fins 44C in a lattice shape.

As illustrated in FIG. 3, the defroster nozzle 44B is provided at a vehicle lower side of the defroster opening 44A, and is formed as a hollow shape increasing in width in the vehicle width direction on progression toward the vehicle upper side (toward the defroster opening 44A). More specifically, the defroster nozzle 44B includes a front wall and a rear wall, not illustrated in the drawings, disposed opposing each other in the vehicle front-rear direction. A pair of mutually opposing side walls 44BA, 44BB, each connecting the two vehicle width direction end portions of the front wall or the rear wall together in the vehicle width direction, are inclined away from each other on progression toward the vehicle upper side. An air conveyance passage through the defroster nozzle 44B is configured by the side walls 44BA, 44BB and the non-illustrated front wall and rear wall.

The defroster nozzle 44B is connected to a vehicle air conditioner 50, illustrated in FIG. 1. As an example, the vehicle air conditioner 50 is disposed at the vehicle front side and lower side of the instrument panel 16 of the vehicle 12. The vehicle air conditioner 50 is provided with a non-illustrated main fan such that an airflow is formed when the main fan is actuated. An evaporator, a heater core and the like (none of which are illustrated in the drawings) are provided on the airflow downstream side of the main fan, and the temperature, humidity and the like of the airflow are adjusted to create regulated air. The airflow is conveyed through the interior of the defroster nozzle 44B connected to the vehicle air conditioner 50 and out through the defroster opening 44A as conditioned air. Note that in addition to the defroster opening 44A, described later, the vehicle air conditioner 50 is also connected to an air conditioner duct connected to non-illustrated blower outlets provided at various positions within the vehicle cabin 14, and is connected to a non-illustrated control device so as to be capable of communicating therewith, so as to be capable of conveying conditioned air through the defroster opening 44A and the other blower outlets at different temperatures and different flow rates according to instructions from the control device.

Guide Section

Figure 2:
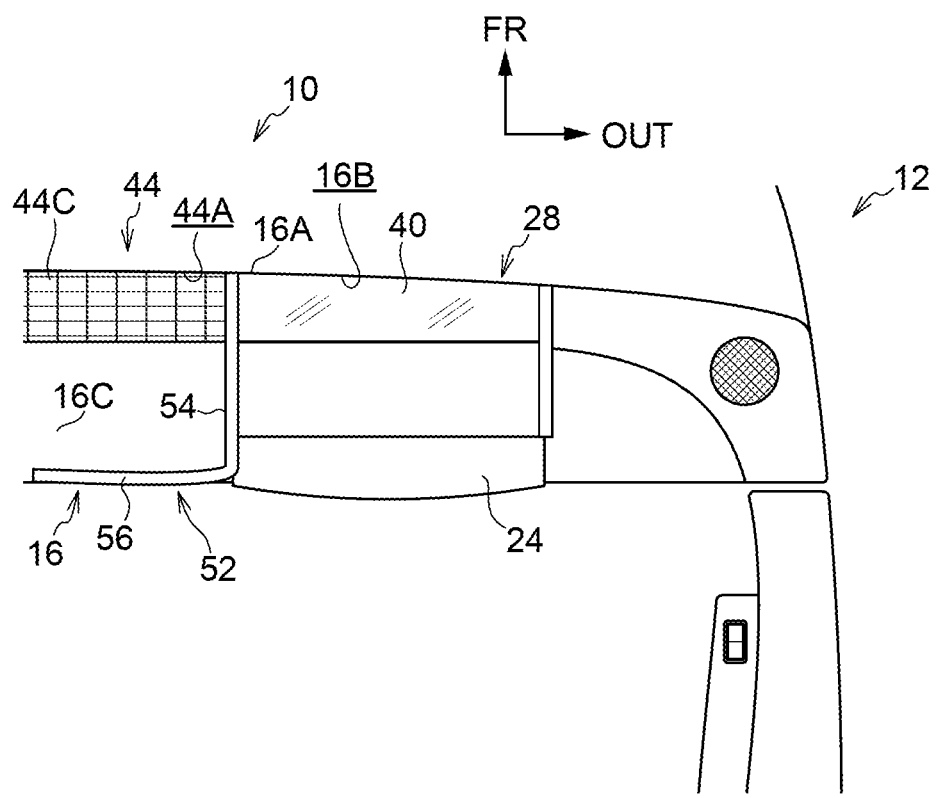
FIG. 2 is a plan view illustrating an instrument panel including a vehicle instrument panel structure according to an exemplary embodiment.

A decorative member 52 is provided to the upper face 16C of the instrument panel 16 between the head-up display device 28 and the defroster opening 44A of the defroster 44. As an example, the decorative member 52 is configured by resin with a metallic-effect surface finish. As illustrated in FIG. 2, the decorative member 52 is formed in a substantially L-shape in vehicle plan view by a first extension section 54, serving as a guide section extending substantially in the vehicle front-rear direction, and a second extension section 56 extending substantially in the vehicle width direction.

Figure 4:
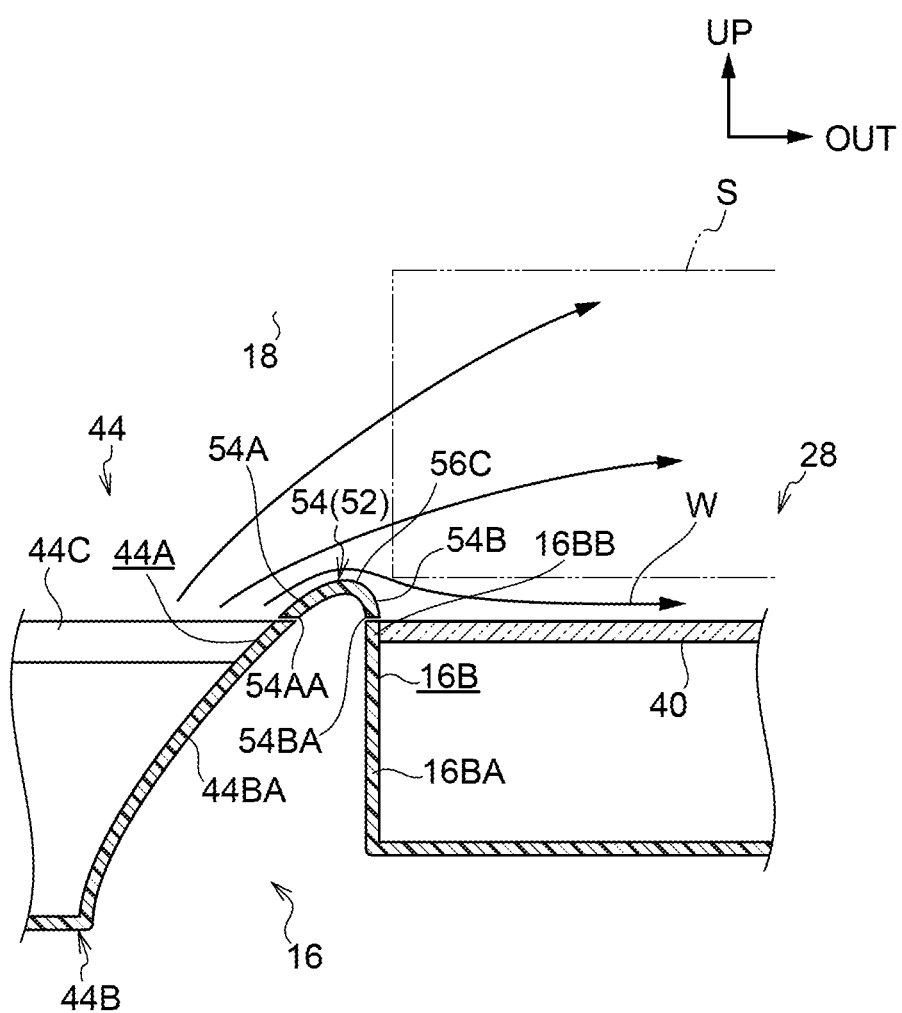
FIG. 4 is an enlarged cross-section illustrating the region Z in FIG. 3.

The first extension section 54 extends from the front end portion 16A of the instrument panel 16 to the vicinity of the meter section 24. As illustrated in FIG. 4, the first extension section 54 has a cross-section profile as sectioned along the vehicle width direction (a direction orthogonal to its length direction) that protrudes toward the vehicle upper side. Specifically, the first extension section 54 is configured by a side wall 54A on the defroster 44 side, a side wall 54B on the head-up display device 28 side, and an apex portion 56C between the side wall 54A and the side wall 54B.

The side wall 54A is inclined at substantially the same angle as the side wall 44BA of the defroster nozzle 44B. Namely, the side wall 54A is inclined toward the head-up display device 28 on progression from a lower end portion 54AA of the side wall 54A toward the vehicle upper side, and an incline angle of the side wall 54A with respect to a horizontal direction is substantially the same as an incline angle of a location of the side wall 44BA of the defroster nozzle 44B corresponding to the defroster opening 44A with respect to the horizontal direction. Namely, the side wall 54A of the first extension section 54 is configured as a contiguous plane to the side wall 44BA of the defroster nozzle 44B in a vehicle front-on view.

The apex portion 56C configures a vehicle upper side portion of the first extension section 54. A lower end portion 54BA of the side wall 54B is provided opposing an upper end 16BB of a side wall 16BA provided on one vehicle width direction side of the opening 16B, within which the head-up display device 28 is provided. Namely, the side wall 54B is curved so as to link between the apex portion 56C and the upper end 16BB of the side wall 16BA. The side wall 16BA of the opening 16B projects upright in a substantially vertical direction, such that an incline angle of the side wall 54B of the first extension section 54 with respect to the horizontal direction is larger (is closer to the vertical direction) than the incline angle of the side wall 54A with respect to the horizontal direction. Namely, the first extension section 54 has a left-right asymmetrical cross-section profile as sectioned along the vehicle width direction.

As illustrated in FIG. 2, the second extension section 56 extends substantially in the vehicle width direction from a rear end portion of the first extension section 54. As an example, the second extension section 56 has a cross-section profile as sectioned along the vehicle front-rear direction (a direction orthogonal the length direction of the second extension section 56) that protrudes toward the vehicle upper side, similarly to that of the first extension section 54. As an example, the second extension section 56 is provided at a rear end portion of the upper face 16C of the instrument panel 16, and serves a decorative function at the rear end portion of the upper face 16C of the instrument panel 16 (see FIG. 1).

Operation and Effects

Explanation follows regarding operation and effects of the present exemplary embodiment.

In the present exemplary embodiment, as illustrated in FIG. 1, the head-up display device 28 and the defroster 44 are disposed alongside each other in the vehicle width direction within the instrument panel 16. The first extension section 54 is provided at the upper face 16C of the instrument panel 16 so as to be disposed between the head-up display device 28 and the defroster 44. As illustrated in FIG. 4, the first extension section 54 has a cross-section profile as sectioned along the vehicle width direction profiled so as to cause airflow W from the defroster 44 to cling to the surface of the first extension section 54 itself, such that the airflow W is blown toward the projection area S. The airflow W traveling from the defroster 44, past the first extension section 54, and toward the projection area S is thereby generated. Since the airflow is conveyed directly toward the projection area S, the projection area S can be quickly defogged. This enables fog on the projection area S to be efficiently removed.

Moreover, the first extension section 54 has a cross-section profile as sectioned along the vehicle width direction that protrudes toward the vehicle upper side. Thus, the airflow W blown from the defroster 44 flows from the lower end portion 54AA on the defroster 44 side of the first extension section 54 while clinging to the surface in a range in the vicinity of the apex portion 56C of the first extension section 54 in a vehicle front-on view. As the airflow W begins to head from the apex portion 56C toward the lower end portion 54BA on the head-up display device 28 side of the first extension section 54, the airflow W separates from the surface of the first extension section 54 and flows toward the projection area S under inertia. Namely, airflow W flowing from the defroster 44 toward both the head-up display device 28 and substantially the vehicle lower side can be generated, thereby enabling the airflow to be conveyed directly toward the projection area S as well.

Moreover, the first extension section 54 is provided with the side wall 54A configured as a contiguous plane to the side wall 44BA on the head-up display device 28 side of the defroster nozzle 44B configuring part of the defroster 44 in a vehicle front-on view. Accordingly, of the airflow W conveyed from the defroster 44 toward the windshield 18, the airflow W flowing along the side wall 44BA on the head-up display device 28 side of the defroster nozzle 44B configuring part of the defroster 44 flows more smoothly toward the first extension section 54. Since the airflow W clings more readily to the surface of the first extension section 54, the airflow W can be efficiently conveyed toward the projection area S. This enables fog on the projection area S to be even more efficiently removed.

Since the first extension section 54 is configured by a member having a different external appearance from the instrument panel 16, the first extension section 54 may be said to accentuate the external styling. Namely, the first extension section 54 may be employed decoratively. This enables both efficient removal of fog on the windshield 18 and external styling qualities to be achieved.

Note that although the first extension section 54 is configured from a resin with a metallic-effect surface finish or the like in the present exemplary embodiment, there is no limitation thereto. The first extension section 54 may be configured by a member having the same external appearance as the instrument panel 16 or the like.

Although the side wall 54A of the first extension section 54 is configured as a contiguous plane inclined at substantially the same incline angle as the side wall 44BA of the defroster nozzle 44B, there is no limitation thereto, and the side wall 54A of the first extension section 54 may have a different incline angle to the side wall 44BA of the defroster nozzle 44B.

Although the first extension section 54 has a cross-section profile as sectioned along the vehicle width direction that protrudes toward the vehicle upper side and is left-right asymmetrical, there is no limitation thereto, and the first extension section 54 may have a cross-section profile with left-right symmetry.

The present disclosure is not limited to the exemplary embodiment described above, and obviously various other modifications may be implemented within a range not departing from the spirit of the present disclosure.

What is claimed is:

1. A vehicle instrument panel structure comprising:
a head-up display device that is provided within an instrument panel positioned at a front section of a vehicle cabin and that displays information by projecting light onto a windshield;
a defroster that is provided within the instrument panel so as to be disposed alongside the head-up display device in a vehicle width direction, and that conveys air toward the windshield; and
a guide section comprising a decorative member formed in a substantially L-shape in a vehicle plan view, the decorative member provided at an upper face of the instrument panel so as to be disposed between the head-up display device and the defroster, and that has a cross-section profile, as sectioned along the vehicle width direction, profiled so as to cause airflow from the defroster to cling to a surface of the guide section such that the airflow is blown toward an area of the windshield in which information is displayed by the head-up display device.

2. The vehicle instrument panel structure of claim 1, wherein the guide section has a cross-section profile, as sectioned along the vehicle width direction, profiled so as to protrude toward a vehicle upper side.

3. The vehicle instrument panel structure of claim 1, wherein the guide section is configured by a member having a different external appearance from the instrument panel.

4. The vehicle instrument panel structure of claim 1, wherein the guide section includes at least a portion configured as a contiguous plane to a side wall on a head-up display device side of a defroster nozzle configuring part of the defroster in a vehicle front-on view.

5. The vehicle instrument panel structure of claim 1, wherein the guide section includes a side wall on a defroster side, a side wall on a head-up display device side, and an apex portion between the side wall on the defroster side and the side wall on the head-up display device side.

6. The vehicle instrument panel structure of claim 5, wherein the apex portion configures a vehicle upper side portion of the guide section.

* * * * *